US010523643B1

(12) United States Patent
Davis et al.

(10) Patent No.: US 10,523,643 B1
(45) Date of Patent: Dec. 31, 2019

(54) SYSTEMS AND METHODS FOR ENHANCED SECURITY BASED ON USER VULNERABILITY

(71) Applicant: Wells Fargo Bank, N.A., San Francisco, CA (US)

(72) Inventors: Chemere Davis, Pineville, NC (US); Andrew J. Garner, IV, State Road, NC (US); Bryan D. Hall, Charlotte, NC (US); H. Brock Kolls, Alpharetta, GA (US); Nicola A Maiorana, Charlotte, NC (US); Ximing Zhao, Charlotte, NC (US)

(73) Assignee: WELLS FARGO BANK, N.A., San Francisco, CA (US)

( * ) Notice: Subject to any disclaimer, the term of this patent is extended or adjusted under 35 U.S.C. 154(b) by 267 days.

(21) Appl. No.: 15/602,891

(22) Filed: May 23, 2017

Related U.S. Application Data

(60) Provisional application No. 62/492,762, filed on May 1, 2017.

(51) Int. Cl.
*H04L 29/06* (2006.01)
*G06F 21/45* (2013.01)
*G06F 16/2455* (2019.01)

(52) U.S. Cl.
CPC .......... *H04L 63/06* (2013.01); *G06F 16/2455* (2019.01); *G06F 21/45* (2013.01); *H04L 63/08* (2013.01); *H04L 63/105* (2013.01); *H04L 63/1433* (2013.01)

(58) Field of Classification Search
CPC .......... G06F 21/30; G06F 21/31; G06F 21/45; G06F 16/2455; H04L 63/06; H04L 63/08; H04L 63/105; H04L 63/1433
See application file for complete search history.

(56) References Cited

U.S. PATENT DOCUMENTS

| 7,673,793 | B2 | 3/2010 | Greene et al. | |
|---|---|---|---|---|
| 7,708,200 | B2 | 5/2010 | Helsper et al. | |
| 8,504,456 | B2 | 8/2013 | Griffin et al. | |
| 8,504,481 | B2 | 8/2013 | Motahari et al. | |
| 8,613,066 | B1 * | 12/2013 | Brezinski | G07C 9/00166 713/168 |

(Continued)

OTHER PUBLICATIONS

Bonneau et al., "Secrets, Lies, and Account Recovery: Lessons from the Use of Personal Knowledge Questions as Google", In Proceedings of the 24th International Conference on World Wide Web, WWW 2015, May 18-22, 2015 Florence Italy. 10 pages.

(Continued)

*Primary Examiner* — Hosuk Song
(74) *Attorney, Agent, or Firm* — Foley & Lardner

(57) ABSTRACT

A computing system includes a network circuit enabling the computing system to exchange information over a network, a customer database storing information pertaining to various user accounts pertaining to a plurality of users, and a risk assessment circuit. The risk assessment circuit is configured search at least one data source to identify a user attribute, determine that the user attribute bears a relationship to a first security credential that is either associated with or potentially associated with a user account, generate a security prompt responsive to the determination, and transmit the security prompt to a user computing device associated with the user.

15 Claims, 5 Drawing Sheets

(56) References Cited

U.S. PATENT DOCUMENTS

| | | | | |
|---|---|---|---|---|
| 8,745,718 | B1* | 6/2014 | Dufel | H04L 63/0807 726/9 |
| 8,776,214 | B1* | 7/2014 | Johansson | H04L 63/0823 713/170 |
| 8,782,217 | B1 | 7/2014 | Arone et al. | |
| 8,862,871 | B2* | 10/2014 | Ramanujan | H04L 9/0847 380/30 |
| 8,887,289 | B1 | 11/2014 | Hullale | |
| 8,903,859 | B2 | 12/2014 | Zeppenfeld et al. | |
| 8,925,062 | B1* | 12/2014 | Brezinski | G07C 9/00166 713/168 |
| 9,235,728 | B2 | 1/2016 | Gottschalk et al. | |
| 9,413,768 | B1* | 8/2016 | Gregg | G06F 21/335 |
| 2009/0106846 | A1 | 4/2009 | Dupray et al. | |
| 2010/0293090 | A1 | 11/2010 | Domenikos et al. | |
| 2012/0278249 | A1 | 11/2012 | Duggal et al. | |
| 2016/0021532 | A1 | 1/2016 | Schenk et al. | |
| 2016/0196615 | A1 | 7/2016 | Yen et al. | |

OTHER PUBLICATIONS

Bonneau et al., "What's in a Name? Evaluating Statistical Attacks on Personal Knowledge Questions", IFCA/Springer-Verlag Berline Heidelberg, FC 2010, LNCS 6052, pp. 98-113.

Griffith et al., "Messin' with Texas Deriving Mother's Maiden Names Using Public Records", ACNS 2005, LNCS 3531, pp. 91-103, 2005.

Jakobsson et al., "Quantifying the Security of Preference-based Authentication", DIM' 08, Oct. 31, 2008. 9 pages.

Javed et al., "Secure Fallback Authentication and the Trusted Friend Attack", 2014 IEEE 34th International Conference on Distributed Computing Systems Workshops. 7 pages.

Kegel, Roeland, "The Personal Information Security Assistant", RE 2015, Ottawa, ON, Canada, Doctoral Symposium, 2015 IEEE. 5 pages.

* cited by examiner

SYSTEMS AND METHODS FOR ENHANCED SECURITY BASED ON USER VULNERABILITY

CROSS-REFERENCE TO RELATED APPLICATIONS

This application claims the benefit of priority to U.S. Application No. 62/492,762, filed May 1, 2017, entitled "SYSTEMS AND METHODS FOR ENHANCED SECURITY BASED ON USER VULNERABILITY", which is hereby incorporated by reference in its entirety.

BACKGROUND

As usage of various online platforms to communicate increases, information pertaining to various members of the population becomes more accessible. For example, details about a user's life (e.g., family information, addresses, and the like) that were previously only accessible through more cumbersome means may now be available online and accessible by anyone through search engines, social media, blogs, and other websites. Such a high quantity of highly accessible data creates security concerns for individuals that use such data as part of a security protocol. For example, available data pertaining to the user may be used by a wrongdoer to guess a user's password to various websites to gain access to more private user data.

SUMMARY

An embodiment relates to a computing system. The computing system includes a network circuit enabling the computing system to exchange information over a network. The computing system also includes a user database storing information pertaining to various user accounts pertaining to a plurality of users. The computing system also includes a risk assessment circuit. The risk assessment circuit is configured to search at least one data source to identify a user attribute. The risk assessment circuit is also configured to determine that the user attribute is related to a first security credential that is either associated with or potentially associated with a user account. The risk assessment circuit is also configured to generate a security prompt responsive to the determination, the security prompt either instructing the user to update information associated with the first security credential or instructing the user to input information regarding a second security credential that is different from the first security credential. The risk assessment circuit is also configured to transmit, by the network circuit over the network, the security prompt to a user computing device associated with the user.

Another embodiment relates to a computer-implemented method. The method includes searching, by a computing system, a data source to identify a user attribute. The method also includes determining, by the computing system, that the attribute is related to a first security credential that is either associated with or potentially associated with a user account. The method also includes generating, by the computing system, a security prompt responsive to the determination, the security prompt either instructing the user to update information associated with the first security credential or instructing the user to input information regarding a second security credential that is different from the first security credential. The method also includes transmitting, by the computing system, the security prompt to a user computing device associated with the user.

Another embodiment relates to non-transitory computer readable media having computer-executable instructions embodied therein that, when executed by a risk assessment circuit of a computing system, causes the computing system to perform operations to identify a user security vulnerability. The operations include searching a data source to identify a user attribute. The operations also include determining that the user attribute is related to a first security credential that is either associated with or potentially associated with a user account. The operations also include generating a security prompt responsive to the determination, the security prompt either instructing the user to update information associated with the first security credential or instructing the user to input information regarding a second security credential that is different from the first security credential. The operations also include transmitting the security prompt to a user computing device associated with the user.

DETAILED DESCRIPTION

Figure 1:
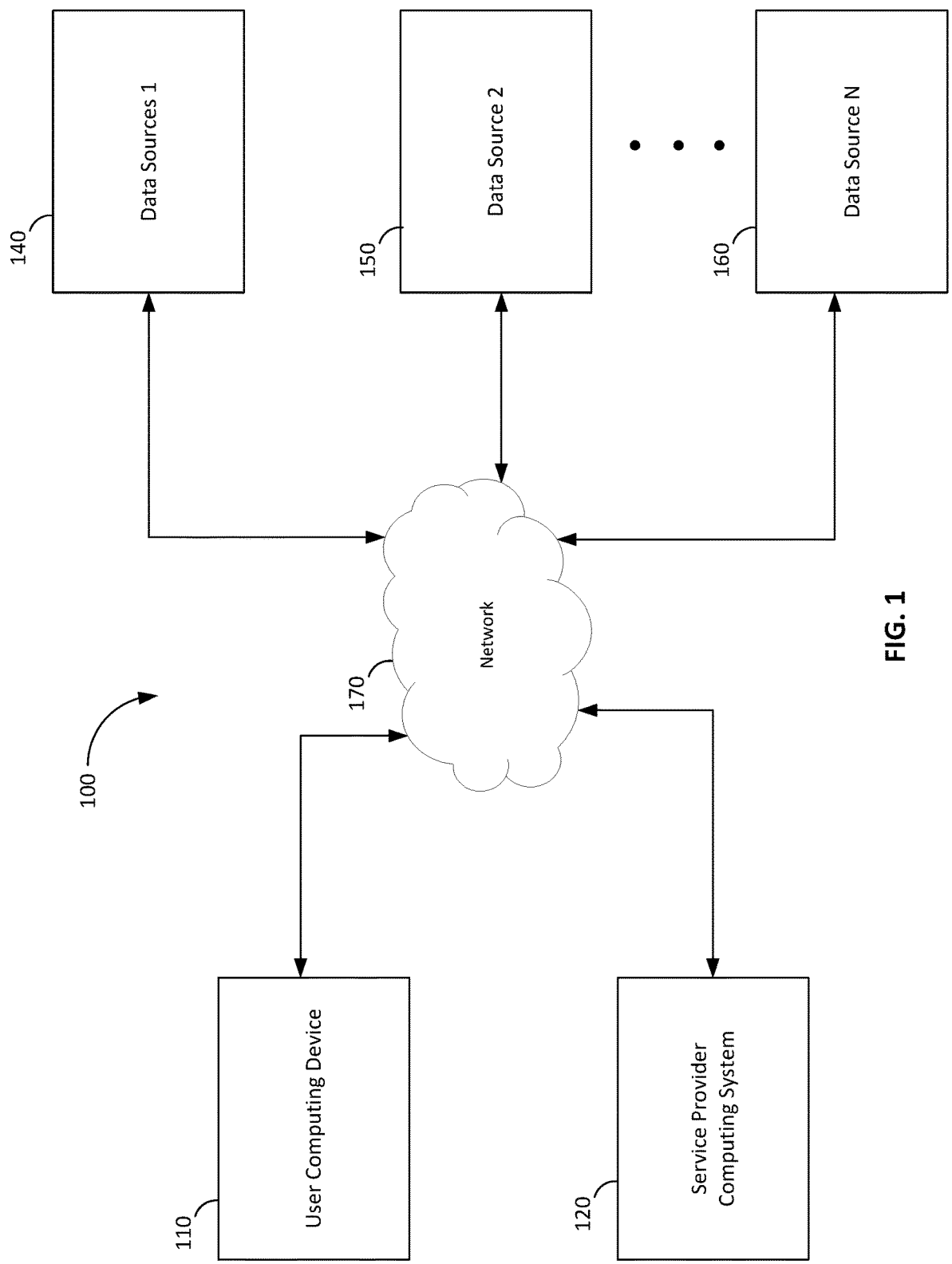
FIG. 1 is a block diagram of a security enhancement system, according to an example embodiment.

Embodiments of systems and methods of enhancing a user's security credentials responsive to detecting a user vulnerability are discussed herein. For example, a user may request to create an account on a website operated by a service provider computing system. In various embodiments, the service provider computing system requests information from the user. Based on the received information, the service provider computing system accesses various data sources to locate information pertaining to the user. Based on the located information, the service provider computing system determines a security risk level for the user. The security risk level may pertain to one or more user security credentials (e.g., username, password, security questions, and the like). Based on the risk level, the service provider computing system makes at least one suggestion for an action that the user should or must take with respect to their account security credentials. As such, the security credentials for the user's account are formulated to minimize user vulnerabilities based on accessible information. User security settings are thus harder to guess by a third party, and private user information is more secure.

The embodiments and implementations of the systems and methods disclosed herein improve current website or security systems through incorporating accessible information into the determination of user security credentials. For example, if the answer for a particular security question is learnable through searching publicly accessible information, the system disclosed herein may not allow the user to use the security question as part the security settings for the user's account. As a result, the security questions used for the user are more difficult for wrongdoers or algorithms to guess, and the user's information stored in relation to the user's account is more secure. Additionally, the systems and methods disclosed herein further improve current systems through dynamically updating user security settings responsive to more or new information pertaining to the user becoming publicly accessible. For example, if a particular user registers for an account at a website and information pertaining to the user becomes accessible six months later, the system disclosed herein is configured to assess various data sources to determine if the accessible information has created an account security vulnerability. If so, the system updates the user's security settings to counteract the vulnerability. As such, the systems, methods, and computer implementations disclosed herein improve the functioning of current security systems by providing functionalities that are novel and non-obvious improvement over current systems.

The embodiments discussed herein may be relevant to any of a variety of circumstances where protection of user information with security credentials are useful. For example, in one embodiment, the functionalities of the system disclosed herein may be added to a mobile application to ensure the protection of user information accessible to the application. The systems and methods disclosed herein may be applied to any form of user authentication.

Referring to FIG. 1, a block-diagram illustrating a security enhancement system 100 is shown according to an example embodiment. The security enhancement system 100 includes a user computing device 110, a service provider computing system 120, and various data sources 140-160, as illustrated by the first database 140, the second database 150, and the $n^{th}$ database 160. Various components of the security enhancement system 100 communicate with one another over a network 170. The network 170 is a data exchange medium, which may include wireless networks (e.g., cellular networks, Bluetooth®, WiFi, Zigbee®, etc.), wired networks (e.g., Ethernet, DSL, cable, fiber-based, etc.), or a combination thereof. In some embodiments, the network 170 includes the internet.

The user computing device 110 is a computing system associated with a user of one or more services provided by a service provider over the network 170. For example, the user may access an online website provided by the service provider computing system 120. Alternatively, the user can seek to access a proprietary network associated with the service provider computing system 120. The user computing device 110 includes one or more processors and non-transitory storage mediums housing one or more logics configured to enable the user computing device 110 to exchange data over the network 170, execute software applications, access websites, generate graphical user interfaces, and perform other similar functionalities. Examples of the user computing device 110 include a personal computer such as a desktop or laptop computer, smartphones, tablets, wearable computing devices such as smartwatches, and the like.

The user computing device 110 is configured to communicate with service provider computing system 120 via the network 170 to exchange information. In some embodiments, this exchange of information includes the user computing device 110 transmitting various communication requests to the service provider computing system 120 over the network 170. The requests may involve the user signing into or registering for an account that will be maintained by the service provider computing system 120. In such communications, the exchanged information may pertain to security credentials associated with the user's account. As described herein, the information communicated by the user may be based at least in part on available information pertaining to the user stored at data sources 140-160.

The service provider computing system 120 is a computing system associated with a service provider with which the user seeks to interact with via the network 170. The service provider may include any entity at which information pertaining to the user may be stored. In various example embodiments, the service provider may include a financial institution, a shopping website, a content provider, an internet blog, a social media platform, an e-mail website, and the like. The service provider may maintain a user account and databases of user information. In response to receiving a communication request from the user computing device 110 to establish an account, the service provider computing system 120 may request information pertaining to the user and gather more information pertaining to the user from data sources 140-160 to generate a user risk profile. The user risk profile may be used in a process in which a user registers for an account to be maintained by the service provider computing system 120. In the registration process, the user may set up authentication credentials (e.g., username, password, security questions, and the like). The user risk profile can make at least one authentication credential suggestion to the user. Alternatively, the user risk profile may also be used in a process through which the service provider computing system verifies the efficacy of the user's authentication credentials for an already established account.

Data sources 140-160 are repository of information pertaining to various users. In various arrangements, the data sources 140-160 include any source of information that may be accessed over the network 170. For example, the first data source 140 may include a social media database (e.g., Facebook®, Twitter®, Friendster®, Yelp®, Myspace®, LinkedIn®, and/or ShutterFly®) storing information pertaining to social media accounts of various users (e.g., user posts to social media, user profile information, and the like). The second data source 150 may include a credit bureau storing various user credit reports associated with various users. The data source 160 may include a government record depository. For example, the data source may include a title record database containing property ownership records for real property, automobile ownership, or the like. Other data sources may include various other websites at which users may have accounts or make information about themselves available such as blogs, forums, online shopping websites (e.g., the customer may write reviews), gift registries, and the like. In various arrangements, the data sources 140-160 are communicably coupled to the network 170 via an associated computing system. The data stored at data sources may be publicly accessible (e.g., in the case of a social media platform, a user may choose to make some information "public") or only be accessible by certain entities (e.g., in the case of a credit bureau, only financial institutions, creditors, landlords, government agencies, and the like may have access to the information).

In some embodiments, in operation, a user wishing to establish an account to be maintained at the service provider computing system 120 operates the user computing device 110 to initiate communications with the service provider computing system 120 over the network 170. For example, the user may activate a web browser on the user computing device and enter in a domain name associated with the service provider computing system 120 into the web browser such that the user computing device 110 transmits a communication request (e.g., a hypertext transfer protocol request) to the service provider computing system. In response, the service provider computing system 120 may transmit web content to the user computing device 110 that enables the user to indicate a preference to register for an account. The user may indicate such a preference and, in response, the service provider computing system 120 transmits additional content requesting at least some information from the user. Upon receipt of the requested information, the service provider computing system 120 formulates and conducts a search of the data sources 140-160 to locate and retrieve accessible information pertaining to the user. The retrieved information is then used in the formulation of an authentication credential-setting process for the user's account. For instance, the retrieved information may be used in determining which security questions to ask the user. For example, if the service provider computing system 120 finds that information pertaining to the user's mother's maiden name is readily accessible via data sources 140-160, the service provider computing system 120 may not use a security question that would elicit such an answer from the user. As a result, the user's security question could not be easily guessed by a bad actor using publicly accessible information, and the user's account is more secure.

Figure 2:
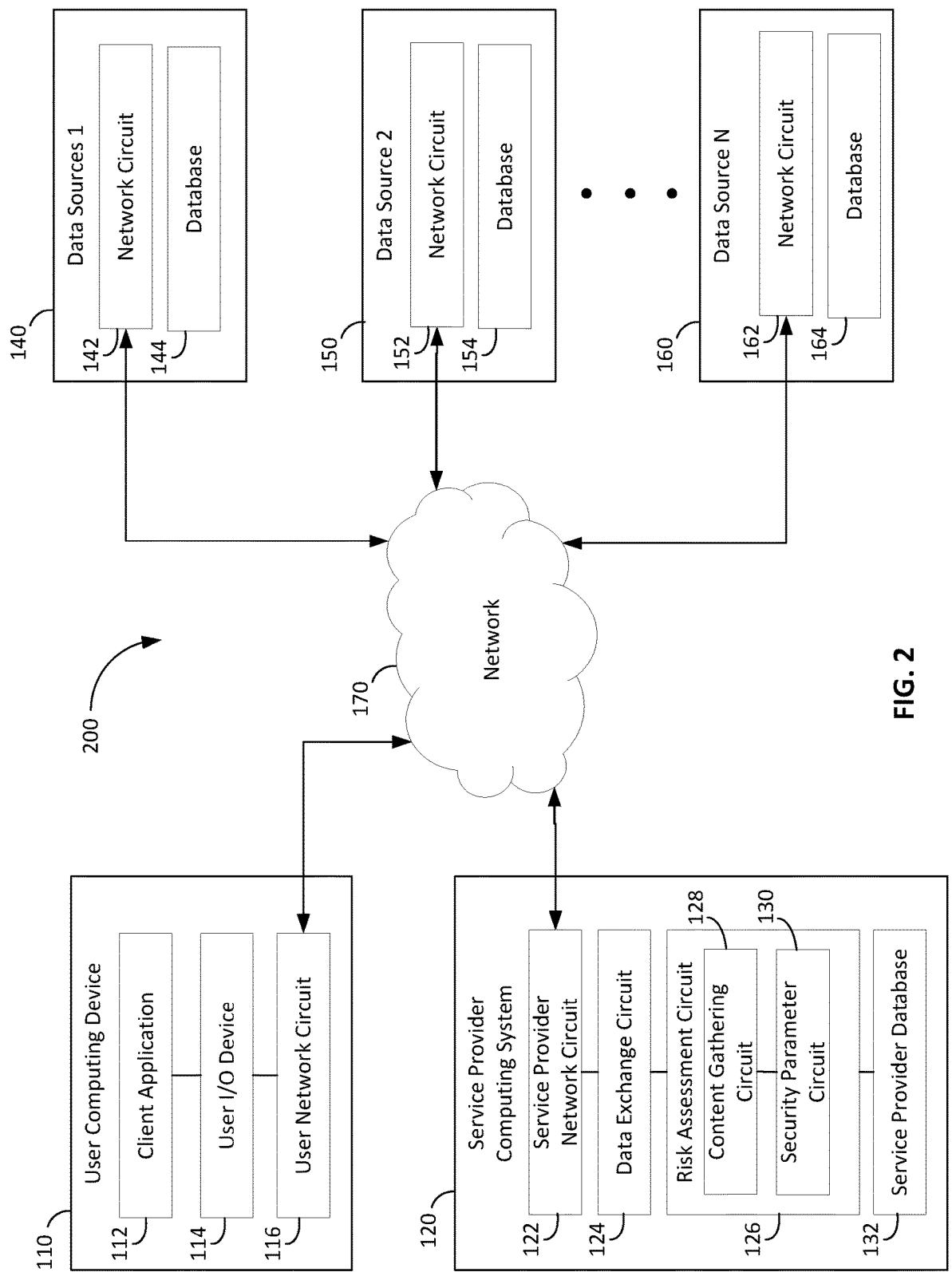
FIG. 2 is a block diagram illustrating an example embodiment of the security enhancement system of FIG. 1, according to an example embodiment.

Referring now to FIG. 2, a block diagram illustrating an example embodiment of the security enhancement system of FIG. 1 is shown including example embodiments of the user computing device 110, service provider computing system 120, and data sources 140-160.

The user computing device 110 includes a client application 112, a user I/O device 114 and a user network circuit enabling the user computing device 110 to exchange data over the network 170. The user I/O device 114 includes hardware and associated logics configured to enable the user computing device 110 to exchange information with a user. An input aspect of the user I/O device 114 allows the user to provide information to the user computing device 110, and may include, for example, a mechanical keyboard, a touchscreen, a microphone, a camera, a fingerprint scanner, any user input device engageable to the user computing device 110 via a USB, serial cable, Ethernet cable, and so on. An output aspect of the user I/O device 114 allows the user to receive information from the user computing device 110, and may include, for example, a digital display, a speaker, illuminating icons, LEDs, and so on. Further, the user I/O device 114 may be configured to include assemblies that serve both input and output functions, allowing the service provider computing system 120 to exchange information with the user computing device 110. Such assemblies include, for example, radio frequency transceivers (e.g., RF or NFC-based transceivers) and other short range wireless transceivers (e.g., Bluetooth™, laser-based data transmitters, etc.).

In various arrangements, the client application 112 is communicably coupled to the service provider computing system 120 (e.g., to the service provider database 132, the risk assessment circuit 126, and the data exchange circuit 124) and is structured to facilitate management of a user's account at the associated service provider. In some embodiments, the client application 112 is a separate software application implemented on the user computing device 110. The client application 112 may be downloaded by the user computing device 110 prior to its usage, hard coded into the memory of the user computing device, or be a web-based interface application such that the user computing device 110 may provide a web browser to the application, which may be executed remotely from the user computing device 110. In the latter instance, the user may have to log onto or access the web-based interface using user credentials set in accordance with the methods described herein.

Irrespective of the form that the client application 112 takes, the client application 112 is structured to provide displays to the user computing device 110 that enable the user to manage service provider accounts as well as communicate other information to the service provider. For example, the user may activate the client application 112 on the user computing device 110, input an address associated with the service provider computing system 120 (e.g., a domain name), and transmit communication requests over the network 170 to the service provider computing system 120. In response, the service provider computing system 120 may in turn transmit content (e.g., web pages) back to the user computing device 110. In some arrangements, the content transmitted back to the user computing device includes content that prompts the user to set up security settings for the user's account at the service provider computing system 120. As described below, in some arrangements, the content that is transmitted to the user is based at least in part on accessible information pertaining to the user that is stored at data sources 140-160.

The service provider computing system 120 includes a service provider network circuit 122 enabling the service provider computing system 120 to exchange data over the network 170, a data exchange circuit 124, a risk assessment circuit 126, and a service provider database 132. The service provider database 132 allows the service provider computing system 120 to retrievably store information relating to the various operations discussed herein, and may include non-transient data storage mediums (e.g., local disc or flash-based hard drives, local network servers, and the like) or remote data storage facilities (e.g., cloud servers). In some arrangements, the service provider database 132 is structured to maintain information relating to various services provided via the service provider computing system 120. For example, if the service provider computing system 120 (e.g., via the data exchange circuit 124 described below) provides an online shopping website, the service provider database 132 can include information such as available product inventory, price information, good or service details, customer information, customer payment information, and so on.

In some arrangements, the service provider database 132 also stores information pertaining to various users of the services provided at the service provider computing system 120 (e.g., via the data exchange circuit 124). In various arrangements, the service provider database 132 may store information pertaining to various user accounts. As will be appreciated, the information stored in the service provider database 132 will vary depending on the nature of services provided by the service provider computing system 120. For example, in some arrangements, the service provider database 132 may include various user shopping accounts containing user payment preference information (e.g., user credit card numbers, addresses), user purchasing histories, and the like. In another example, the service provider is a financial institution, and the service provider database 132 includes personal user information (e.g., names, addresses, phone numbers), identification information (e.g., driver's license numbers, standard biometric data), and user financial information (e.g., token information, identification code information, identification code algorithms, account numbers, account balances, available credit, credit history, transaction histories).

The data exchange circuit 124 is configured to send and receive information over the network 170 via the network circuit 122, and to store and retrieve merchant information in the service provider database 132. In some arrangements, the data exchange circuit 124 is configured to provide users with access to content stored in the service provider database 132 to provide a service to the users. For example, the data exchange circuit 124 may maintain an online marketplace by, for example, updating the content and functionality available to the user on the client application 112. In this regard, the data exchange circuit 124 updates the displays viewable on the user computing device 110 when the user computing device 110 is implementing the client application 112. For example, the data exchange circuit 124 may retrieve information from the service provider database 132, assemble the retrieved information into webpages, and transmit the webpages over then network 170 to the user computing device 110 for viewing by the user via the client application 112.

The risk assessment circuit 126 is structured to determine a user's security vulnerability based on accessible information pertaining to the user stored at data sources 140-160 and set at least one user security parameter based on the user's vulnerability. In this regard, the risk assessment circuit 126 is structured to access the data sources 140-160 to identify information pertaining to a user, generate a risk profile based on the identified information, generate a user security preference based on the risk profile, and transmit content to the user computing device 110 prompting the user to take a security action based on the security preference. Accordingly, the risk assessment circuit 126 is communicably coupled to the service provider network circuit 122, the data exchange circuit 124, and the service provider database 132.

In some arrangements, the risk assessment circuit 126 includes a content gathering circuit 128 and a security parameter circuit 130. Each of the circuits may be communicably and operatively coupled to each other. Other embodiments may include less or more circuits without departing from the spirit and scope of the present disclosure. Further, some embodiments may combine the activities of one circuit with another circuit to form a single circuit. Therefore, those of ordinary skill in the art will appreciate that the present arrangement is not meant to be limiting.

The content gathering circuit 128 is structured to access data sources 140-160 to gather information pertaining to various users. In some arrangements, the content gathering circuit 128 is structured to request information pertaining to a user in a registration process described below. The requested information may include, for example, a user's name, address, and the like. Upon receiving the requested information from the user, the content gathering circuit 128 may use this information to formulate requests to access certain locations at data sources 140-160. For example, responsive to receiving a user's name, the content gathering circuit 128 may use the received name to populate various templates for accessing various data sources 140-160. For example, the content gathering circuit 128 may insert the received user name into a template to request a specific webpage (e.g., a social media profile page) having information pertaining to the user. Based on the response received from the data source, the content gathering circuit 128 is configured to parse received content to identify accessible information pertaining to the user.

In various arrangements, the content gathering circuit 128 includes various data processing modules structured to extract various user attributes from the content received from data sources 140-160. In one example, a particular data source (e.g., a social media website) may have certain locations (e.g., profile pages) having standardized arrangements of user data. Datasets describing such arrangements may be used to extract user attributes. For example, a particular dataset may include information that maps a particular location on a web page to a particular user attribute. To illustrate, on a social media profile page, a user's address or family information may always be located in the upper right hand corner. Thus, upon receiving a profile page from this particular social media web page, the content gathering circuit 128 may retrieve an attribute dataset associated with the social media webpage to ascertain various user attributes. If the received webpage includes information in the upper right hand corner location described by the dataset as being associated with user family information, the content gathering circuit may identify the information as user family information, and use the information to fill in a "family information" portion of the user's profile.

In some arrangements, the content gathering circuit 128 includes textual analysis algorithms structured to identify user attributes. For example, responsive to receiving a requested piece of information (e.g., a web page, document, or the like) from a data source 140-160, the content gathering circuit 128 may run a preliminary analysis to ascertain a portion of the web page that relates to the user. For example, some data sources may (e.g., phone books, government records, and the like) may return information that pertains to multiple users. In response to receiving such information, the content gathering circuit 128 may ascertain properties of the received information that separates the information into user-specific components. For example, in one data set, there may be space between each block of information that pertains to a particular user that is followed by a name. The content gathering circuit 128 may include a pattern recognition algorithm that assesses the spatial arrangement of the information contained in the received content to identify such a pattern and perform a keyword analysis on the received information to locate the portion of the received dataset that pertains to the user.

Having ascertained the information in the received content that pertains to the user, the content gathering circuit 128 may further analyze the received content to ascertain the specific attributes of the user described therein. To do this, the content gathering circuit may perform a two-step process. First, the content gathering circuit 128 may identify any attribute descriptors contained in the received content. Attribute descriptors may be headers, titles, words, or the like that are descriptive of the meaning conveyed by other content proximate to the descriptor. For example, if the content gathering circuit 128 receives a government record from a publicly accessible database via the processes discussed above, the government record may constitute a form containing several descriptors. For example, an "address" descriptor may be located proximate to a data entry having an address format. Accordingly, the content gathering circuit 128 may perform a textual analysis on the document to locate the address descriptor. Next, based on the located descriptor, the content gathering circuit 128 locates information that is associated with the descriptor. For example, the content gathering circuit 128 may identify a data entry that represents a user address located proximate to the descriptor based on the format of the data entry. After the data entry is identified, the content of the entry (e.g., the actual address) is retrieved from the content and used to populate the user profile in association with the descriptor.

In another example, the received content may constitute a social media post by the user. The social media post may constitute, for example, a written sequence of words. The content gathering circuit 128 may identify various components of the written sequence (e.g., sentences) and identify various aspects (e.g., types of words) to identify both descriptors and objects of those descriptors. For example, if a user posted "my dog Spot . . . ," the content gathering circuit 128 may populate an entry in the user's profile that identifies the user's dog as being named Spot. Thus, by retrieving various descriptors and associated objects from the received content, the content gathering circuit 128 can populate a user profile using data in various formats received from multiple types of data sources.

The security parameter circuit 130 is structured to manage security settings for a user account to be maintained at the service provider computing system 120. In some arrangements, the security parameter circuit 130 is configured to set initial user security credentials during a registration process for a user account. In this regard, the security parameter circuit 130 may generate various prompts that request the user to input information that will be used to authenticate the user when the user seeks to access account information. For example, one prompt may request a user to input a username and a password. Another prompt may request the user to input answers to various security questions. Another prompt may request any of the above information from the user. Such prompts may be transmitted to the user computing device 110 over the network 170 via the network circuit 122.

In some arrangements, the prompts specifically generated by the security parameter circuit 130 may vary depending on the user. For example, in some arrangements, the security parameter circuit 130 generates a first prompt to request a first set of information from the user. The first set of information requested by the first prompt may be specifically formulated to include the information that is necessary for the content gathering circuit 128 to formulate information requests to gather information from data sources 140-160. For example, the prompts may be based on the templates discussed above. As such, upon the user inputting the information requested by the first prompt, the security parameter circuit 130 may transmit the user-input information to the content gathering circuit 128, which may in turn populate the templates and transmit communication requests to various data sources 140-160 to locate accessible information pertaining to the user at data sources 140-160.

Upon the content gathering circuit 128 generating the user profile discussed above, the security parameter circuit 130 may use the profile in formulating additional steps in the registration process. In some arrangements, for example, the content gathering circuit 128 may use the profile to select a group of security questions to ask a user via additional prompts. For example, the service provider database 132 may store a plurality of security prompts or components of security prompts that are retrieved by the security parameter circuit 130 for use in the registration process or security settings process. Amongst such prompts may be a set of security questions that are used to authenticate the user when the user seeks to access an account after registering. Security questions may be designed to request information from the user that is generally only known by the user to serve as an additional level of authentication. For example, a security question may ask the user for the user's mother's maiden name. While such information is generally only known by a user or by those closely affiliated with the user, this information may be discoverable via accessing data sources 140-160. For example, a genealogy website may include such information, or such information may be obtainable via a user's social media account. If this is the case, the whole purpose of the security question is defeated. A bad actor may guess the user's password, learn the mother's maiden name by accessing a data source, and gain access to the user's account and all of the private information stored therein. To prevent such an occurrence, the security parameter circuit 130 may selectively retrieve security questions from the service provider database 132 based on the profile generated by the content gathering circuit 128.

In this regard, the security parameter circuit 130 may retrieve information from the profile generated by the content gathering circuit 128 to identify attributes that are known about the user (e.g., family information, pet names, addresses, and the like). After this, the security parameter circuit 130 may only retrieve security questions from the service provider database 132 that don't contain descriptors of those attributes. For example, if the user's profile contains the user's favorite color, the security parameter circuit may not retrieve a security question asking that information from the user.

Once a set of security questions stored in the service provider database 132 has been rendered ineligible due to the information in the user's profile, the security parameter circuit 130 may retrieve a subset of the remaining security questions. In some arrangements, the subset is determined based on the user profile generated by the content gathering circuit 128. In some arrangements, the user's profile may be subdivided into any number of categories. The entries in each category may all be inter-related with one another. For example, one category may be a subject of the entries. For example, the user's address, name, and the like may be in a "user biographical information" category, while user's education and employer information may be in a "user life history category." Entries describing user activity (e.g., vacations, achievements, and the like) may be in a "user activity" category. The security parameter circuit 130 may score these categories based on the amount of information contained in each category. For example, in the "user biographical information" category discussed above, the security parameter circuit 130 may compare the various attributes known about the user in that category to a baseline profile in that category to generate a completion score. A similar procedure may be followed for each category. In some arrangements, only security questions requesting information from the user that is in a category having a completion score below a predetermined threshold are retrieved for use as authentication credentials for the user.

Having assessed the user's profile, the security parameter circuit 130 may present the user with a series of additional prompts requesting the user to set various authentication credentials. Additional prompts may ask the user for a username, password, and the like.

Upon receiving the user's responses to the transmitted prompts, the security parameter circuit 130 may further assess the user's responses to determine their strength. In some arrangements, the security parameter circuit 130 may run a comparison between a user response to a prompt against the information contained in the user profile generated by the content gathering circuit 128. For example, if the user inputs a username into a prompt requesting the same, the security parameter circuit 130 may sweep the user's profile for the inclusion of any information that is related to the username. For example, the user may use the same username for an account at another service provider. Alternatively, the username may be a combination of user attributes (e.g., street name and first name) contained in the user's profile.

Additionally, the security parameter circuit 130 may also use information input by the user to generate additional search queries to request additional information from data sources 140-160. For example, if the user inputs an answer to a security question requesting the user to identify a specific user attribute, the security parameter circuit may transmit the user's response to the content gathering circuit 128. In turn, the content gathering circuit 128 may formulate additional information requests based on the user's response. In other words, now that an additional attribute pertaining to the user is known from the user's security question response, a specifically tailored sweep of data sources 140-160 may be made specifically for that attribute. For example, based on the learned attribute and the information already known about the user, the content gathering circuit 128 may run a search on a search engine, or send specifically formatted information requests to the data sources 140-160 based on the user attribute. For example, if the user answers a security question pertaining to a pet's name, the content gathering circuit may run a search using a search for content including, for example, a pairing of the user's name and the pet's name. The search engine may return a plurality of results. In turn, the content gathering circuit 128 may launch a web crawler application configured to harvest the content returned in the search results to determine if any of the results return the pet's name.

In another example, a particular data source of data sources 140-160 may include a subdivision that is related to the user-input attribute. Going back to the pet name example, a particular data source may, for example, be an online forum. Such a forum may have a "pets" subdivision or the like. Thus, in response to receiving the user's pet's name, the content gathering circuit 128 may generate an information request (e.g., according to a template) that requests various instances of the pet name from the data source. In response to receiving the results (if any), the content gathering circuit 128 may perform an analysis on the results to locate if any of the identified instances includes other attributes known about the user in the user's profile (e.g., user's name, username input in another prompt, and the like). If so, the content gathering circuit 128 may update the user's profile.

After performing this analysis for at least a portion of the information input by the user, the security parameter circuit 130 may generate a security score for the user's security credentials. The security score may be based on a plurality of factors. For example, each component of the user's authentication credentials (e.g., username, password, answers to security questions, biometric data, and the like) may be independently scored based on two metrics: a symbolic strength and an accessibility strength. With respect to symbolic strength, the user's responses to various questions may be assessed against various symbolic metrics. For example, a password may be assessed based on the characters included in that password (e.g., whether it contains a number and a symbol, contains an existing word, etc.) to generate a symbolic strength score for the password. In another example, a user's answer to a security question may be symbolically scored based on its spelling. If the user misspelled an answer, for example, it may be difficult for the user to repeat the misspelling. Accordingly, misspelled answers to security questions may be given a low symbolic score. In some arrangements, some components of the user's authentication credentials are not given a symbolic strength.

With respect to the accessibility strength, the user-input security credentials are assessed against information contained in the user profile generated by the content gathering circuit 128. The accessibility strength score may be generated under either a continuous framework (e.g., the score can take any value within a predetermined range) or a discrete framework (e.g., the score can take on one of a subset of values such as 1, 2, or 3). In either case, the particular accessibility score that a security credential receives is dependent on if information relating to that security credential is accessible through data sources 140-160. Generally speaking, the more accessible that information bearing a relationship to the user security credential is, the lower the accessibility score received. For example, in a discrete framework, a particular component of the user's authentication credentials may receive a score of 0, 1, or 2. In this example, a particular security credential may receive a 2 if the content gathering circuit 128 was unable to locate any information bearing any sort of relationship to that credential in data sources 140-160. For example, if the user inputs a username that the content gathering circuit 128 cannot locate as being associated with the user (e.g., the user has not used the username before, or at least the username is not identifiable by an external entity as being associated with the user), that username may receive a 2 in terms of accessibility strength. A particular component may receive a 0 if it is accessible on at least one of data sources 140-160 through a direct series of search commands. For example, if the content gathering circuit 128 was able to locate a user attribute being used as a security credential (e.g., a response to a user security question), by performing a simple search of the user's name at a data source 140-160, the component may receive a 0. For any circumstances between those warranting a 0 and a 2, the component may receive a 1.

Having determined the symbolic and accessibility strength of each component, the security parameter circuit 130 may generate an overall strength for each component of the user's security settings. In various arrangements, the overall strength may be a weighted combination of the symbolic strength and the accessibility strength for each component. Having determined the overall strength of each component, the security parameter circuit 130 may determine an overall security score for the user. The overall security score may be a weighted combination of all of the individual scores for each element (e.g., username, password, security questions, and the like). Each score may be presented to the user via an account management screen accessible to the user via the client application 112.

In various arrangements, the security parameter circuit 130 may suggest changes to the user's account security settings if the overall strength for a particular component or the overall security score for the user drops below various predetermined thresholds. For example, if the security parameter circuit 130 determines that the user's answer to a particular security question is accessible via data sources 140-160, the security parameter circuit 130 may present the user with a prompt instructing the user to provide an answer to another security question configured to elicit an answer from a customer that is not accessible via data sources 140-160.

In various arrangements, data sources 140-160 include network circuits 142-162 enabling external computing systems (e.g., the service provider computing system 120) to request and receive information stored in databases 144-164 over the network 170. Databases 144-164 allows the data sources 140-160 to retrievably store information relating to the various operations discussed herein, and may include non-transient data storage mediums (e.g., local disc or flash-based hard drives, local network servers, and the like) or remote data storage facilities (e.g., cloud servers). As will be appreciated the types and formats of information stored in a particular database of the group of databases 144-164 will vary depending on the nature of the data source 140-160 with which the database is associated. In some arrangements, a particular database may include raw digital information that may be directly transferred to requestors (e.g., the service provider computing systems 120) via an application programming interface (API). Databases may also include processed content in the form of web pages and the like. Databases may include image files, graphics, and the like. Database may store digital copies of various documents (e.g., government records, and the like). In some arrangements, certain databases may be similar to the service provider database 132 discussed above. For example, certain data sources 140-160 may constitute service providers other than the service provider associated with the service provider computing system 120. As such, an associated database may include describing a user account information (e.g. usernames, purchasing history, account history, and the like) at the service provider. Depending on the nature of the service provided by the service provider, some of this account information may be publicly accessible. For example, the service provider may be a social media provider or a host of a blog and the user may publicly post information under a username. Any sort of information that is in any way retrievable may be stored in databases 144-154.

Figure 3:
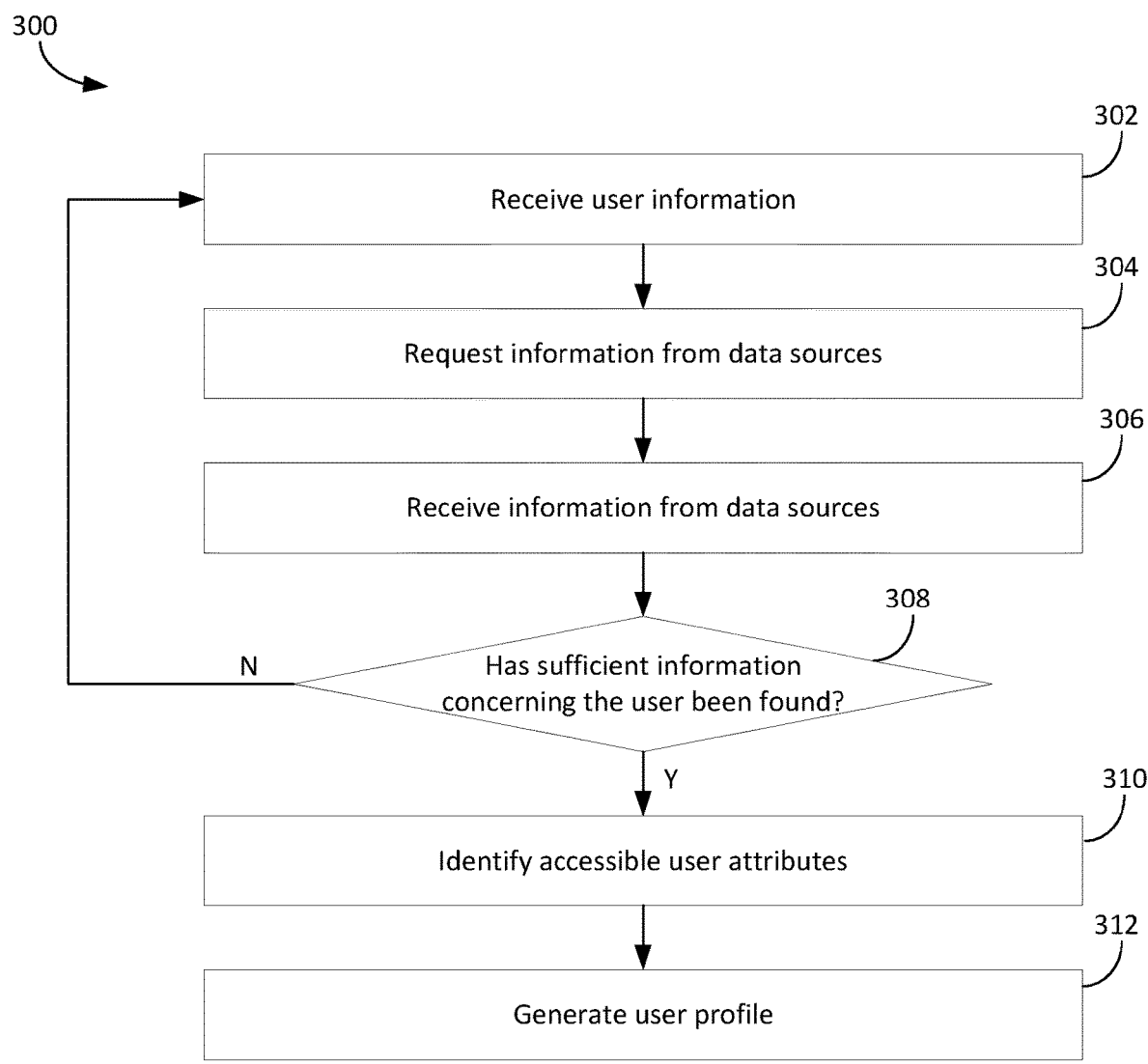
FIG. 3 is a flow diagram of a method of creating a profile of user attributes that may be learned via accessible data sources, according to an example embodiment.

Referring now to FIG. 3, a flow diagram of a method 300 of generating a profile of publicly accessible information regarding a user is shown, according to an example embodiment. The method 300 may be performed by components of FIGS. 1-2 such that references may be made to one or more components of FIGS. 1-2 to aid the description of the method 300.

At step 302, information regarding a user is received. The source of the received information varies depending on the circumstance. For example, in the case of a new user, the user computing device 110 may access a website provided by the data exchange circuit 124 of the service provider computing system 120. In response, the data exchange circuit 124 may present the user with a display prompting the user to establish an account at the website. In response to the user indicating a preference to establish the account, the user may be presented with an initial registration interface for an account to begin the registration process. The initial registration interface may request biographical information (e.g., name, address, and the like) from the user. Upon the user entering the requested information into the user computing device 110, the user computing device 110 may transfer the user-input information to the risk assessment circuit 126.

In another example, the user may already have an account at the service provider associated with the service provider computing system 120. As a result, various forms of information regarding the user may be stored in the service provider database 132. Accordingly, to initiate the method 300, the risk assessment circuit 126 (e.g., via the content gathering circuit 128) may retrieve user information from the service provider database 132.

At step 304, search parameters are generated. In various embodiments, search parameters may include both the identity of the data sources 140-160 to scan for information pertaining to the user and the particular information that is to be requested from a particular data source 140-160. In some arrangements, the content gathering circuit 128 is configured to scan a predetermined set of data sources 140-160 for each user. Accordingly, the search parameters include the formulation of a scan of each data source in the predetermined set. The nature of a scan for a particular data source may vary depending on the nature of the data source. For example, some data sources 140-160 may include a searching functionality (e.g., a search feature on a website) enabling requesting entities to target certain content stored at the databases 144-164. As such, the content gathering circuit 128 may formulate a search request using the information received at step 302 (e.g., the user's name).

In some arrangements, the service provider computing system 120 may have access to various APIs associated with various data sources 140-160 enabling the service provider computing system to receive specifically-requested information. Accordingly, the content gathering circuit 128 may formulate an information request using the information received at 302 to request information via various data source APIs.

At step 306 information from data sources is received. As will be appreciated, the format of the data received from the various data sources 140-160 will vary depending on the data source. For example, in cases where the content gathering circuit 128 requests information from a particular data source using an API, the returned data may be in a raw format (e.g., unprocessed for presentation to a user) and be directly analyzed by the content gathering circuit 128 for content related to the user. Other data sources may return data in a more processed form. For example a government records database may return a digital image of a document bearing the user's name. As such, to ascertain the information regarding the user contained in the returned image, the content gathering circuit may perform optical character recognition (OCR) or the like on the content to extract raw data from the returned image.

In another example, the information returned from a particular data source may include a web page or the like. As such, the information is not in a format that is well suited for the automated processing steps to be performed by the content gathering circuit 128. Accordingly, the content gathering circuit 128 may extract the data contained in any returned web page. Additionally, in other examples, the information returned from a particular data source may include a series of web pages. For example, if the information requested from a particular data source at step 304 was a search string inputted into a searching functionality at the data source, a series of results containing that search string may be received. In such situations, the content gathering circuit 128 may be configured to fetch each of the web pages identified in the returned search results, and perform the extraction techniques discussed above to obtain the data contained in the fetched web pages.

At step 308, it is determined if sufficient information pertaining to the user has been returned from data sources 140-160. As used herein, the term "sufficient information" refers to a level of confidence that the service provider computing system 120 has that information received from data sources 140-160 actually relates to the desired user. To ascertain a confidence level, the content gathering circuit 128 may perform two-step process. First, the content gathering circuit 128 may perform a sweep of all of the returned data to locate instances of any of the user information received at 302. For example, the content gathering circuit 128 may systematically search through each dataset (e.g., associated with each data source or each document or webpage returned by each data source) for instances of a user's name received at 302. If no instances are found, then the content gathering circuit 128 may conclude that no information concerning the user has been recovered. In such a situation, the content gathering circuit 128 may revert back to step 302 to request more information from the user to perform a more refined search. For example, the content gathering circuit 128 may transmit a prompt to the user instructing the user to identify any nicknames or usernames that the user has been associated with. Upon receiving such information, the content gathering circuit 128 may re-formulate various information requests to various data sources 140-160 using the received information and re-perform steps 304-308. In some arrangements, if no information is gathered about the user using the refined user information, the method 300 ends.

However, if at least one instance of the user information received at 302 is located in the received information, the content gathering circuit 128 may take steps to verify that a learned attribute actually pertains to the intended user. For example, if a particular user attribute was learned from a particular piece of information (e.g., a particular webpage) from a particular data source, the content gathering circuit 128 may perform an additional analysis on that piece of information to verify the attribute. For example, the content gathering circuit 128 may search the particular piece of information for other user attributes contained in either the information received at step 302 or attributes learned through assessment from other pieces of information received from various data sources 140-160. For example, if a particular webpage received from a particular data source identifies that the user lives or used to live on a particular street, the content gathering circuit 128 may scan all of the information received at step 306 for that particular street name. If the street name shows up in association with the user more than once, then that particular user attribute is verified and included in the user's profile. In another example, if the particular piece of information from which a user attribute is learned contains other verified user attributes then the user attribute may be verified. To illustrate, if a webpage contains a user's pet's name as well as a user address that is also included in a dataset received from a verified data source, then the user's pet's name is verified.

In some embodiments, the confidence level may also be based on the data source 14-160 that the information was received from. For example, each data source 140-160 that the content gathering circuit 128 receives information from may have an associated trustworthiness rating preconfigured by the service provider. If the attribute is learned via information received from a data source having a particularly high trustworthiness rating, for example, the attribute may be verified and included in the user's profile. If the attribute is learned via information received from a data source having a low trustworthiness rating, the content gathering circuit 128 may perform the verification checks described above. In some embodiments, if no instances of the user information received at 302 are found in the data received from data sources 140-160 or if the received information meets none of the above verification checks, the method 300 ends.

At step 310, accessible user attributes are identified. In various arrangements, the content gathering circuit 128 performs a contextual analysis of the data received from various data sources 140-160 to ascertain information that may be learned about the user through accessing data sources 140-160. In some embodiments, for each instance of the received user information at 302, the content gathering circuit 128 performs an analysis of the data surrounding the instance to gather information pertaining to the user. For example, if the content gathering circuit 128 locates an instance of the user's name within a government document containing various fields, the content gathering circuit may scan the other fields in the document to ascertain various user attributes that may be learned by accessing the government document. In another example, the general context of an instance of user information may be assessed to ascertain user attributes. For example, if the user's name shows up in the context of an article, blog post, social media post, or the like, the content gathering circuit 128 may perform a textual analysis of surrounding content. For example, if the received information includes a social media post containing the phrase "my dog Bob," the content gathering circuit 128 may identify that the user has a pet dog named Bob.

In various other examples, data templates may be used to identify various user attributes. If, for example, the content gathering circuit 128 receives consistently formatted datasets from a particular data source, a data template may be generated that maps information received from the data source into user attributes. An example of such a data source may be a social media website where each user of the website has a similarly formatted profile page. The profile page may list a series of user attributes (e.g., family members, home address, employment history, and the like) in consistent locations for various users. As such, knowledge of a particular user attribute may be gained by assessing a particular location on the user's profile page. Accordingly, the content gathering circuit 128 may assess profile pages received from the social media websites using a profile page template that maps dataset locations into various user attributions. This data template approach may be applicable to a plurality of different other types of data sources such as genealogy websites, public directories, and the like.

At 312, various user attributes are used to generate a user profile. The profile may include a series of general descriptors of various attributes (e.g., "pet name," "wife's maiden name," "street name," etc.) as well as a series of user-specific entries associated with the general descriptors. For example, if the content gathering circuit 128 learns that the user has a dog named spot via the processes discussed above, the user's profile may include an entry such as "pet name: Spot."

Figure 4:
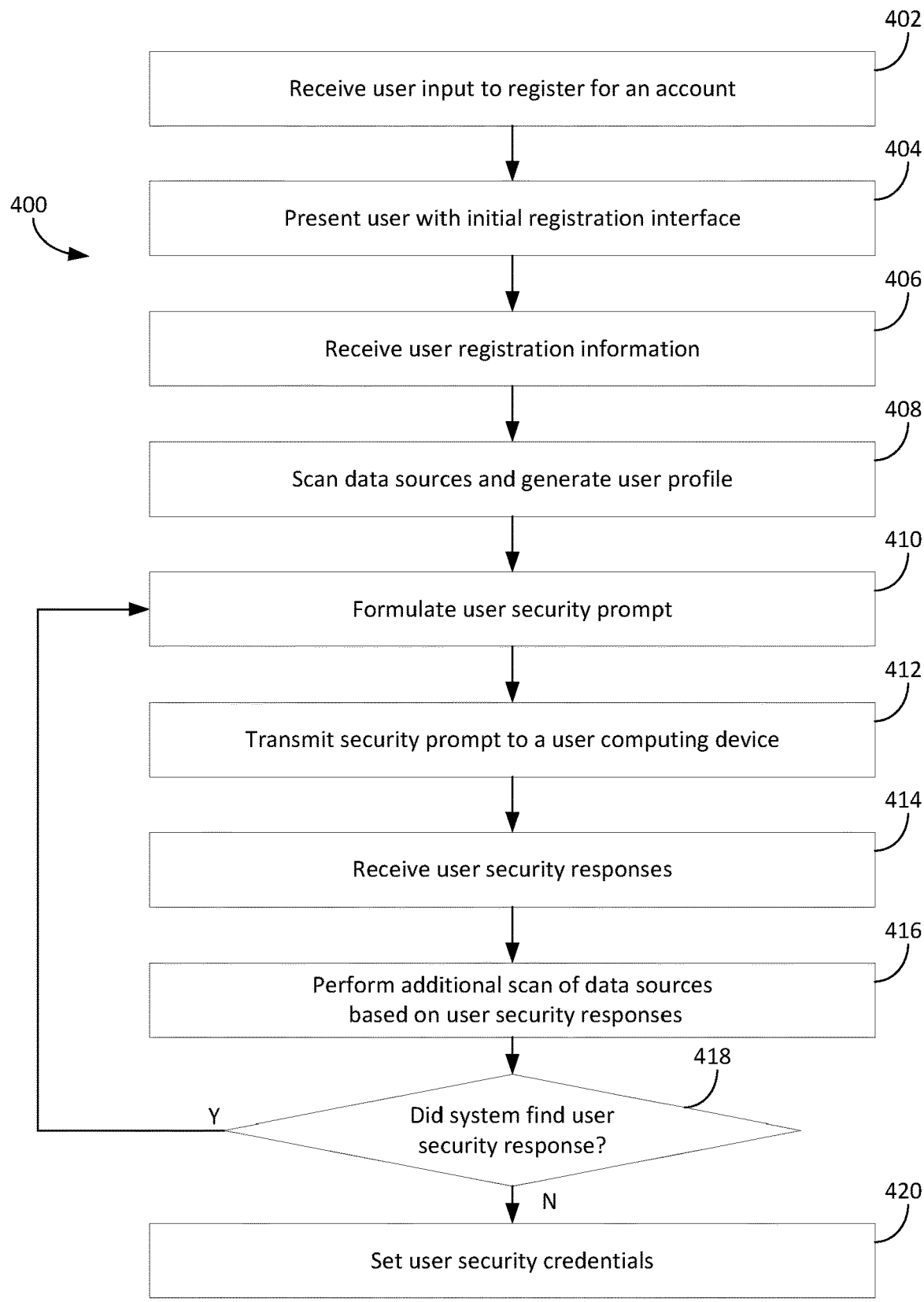
FIG. 4 is a flow diagram of a method creating a set of security credentials for a newly created user account, according to an example embodiment.

Referring now to FIG. 4, a flow diagram of a method 400 of setting a user security credential during the user's registration for an account is shown, according to an example embodiment. The method 400 may be performed by components of FIGS. 1-2 such that references may be made to one or more components of FIGS. 1-2 to aid the description of the method 400.

At 402, a user input to register for an account is received. For example, a user, via the client application 112, may access a website associated with the service provider computing system 120 and provide a registration input (e.g., select an account registration button) on the website that is received by the data exchange circuit 124 and/or risk assessment circuit 126.

At 404, the user is presented an initial registration interface. For example, in response to receiving the registration input from the user computing device 110, the data exchange circuit 124 may transmit an interface to the user computing device 110 over the network 170 that requests various forms of information from the user. For example, the interface may include various fields requesting various forms of information from the user (e.g., name, address, and the like). Alternatively or additionally, the interface may request the user to input information pertaining to a security credential (e.g., username and/or password) that may potentially be used in association with the user's new account.

At 406, user registration information is received. Upon the user inputting the requested information into the various fields of the registration interface transmitted at 404, the user-input information may be transmitted to the data exchange circuit 124 over the network 170 and communicated to the risk assessment circuit 126. In some embodiments, upon receipt of the initial registration information, a client application (e.g., the client application 112) is transmitted to the user computing device 112. Such a client application may include program logic that is structured to cause a processor of the user computing device 112 to perform any of the functions described herein as being performed by the risk assessment circuit 126. As such, the user computing device 112 may also perform any of the methods described below.

At 408, data sources 140-160 are scanned for various user attributes. In various embodiments, the risk assessment circuit 126 (e.g., via the content gathering circuit 128) performs the method 300 discussed above in relation to FIG. 3 to generate the user's profile of user attributes that are discoverable via accessing data sources 140-160. In some arrangements, the risk assessment circuit 124 skips step 408 and waits until 416 to initially scan data sources 140-160 for user information.

At 410, a user security prompt is formulated. In various example embodiments, the risk assessment circuit 126 (e.g., via the security parameter circuit 130) generates a user security prompt using content stored in the service provider database 132. As discussed above, the service provider database 132 may include a plurality of pre-formulated security prompts. Such pre-formulated prompts may request the user to establish various account security credentials such as usernames, passwords, answers to security questions, and the like. As such, the security parameter circuit 130 may selectively retrieve the prompts stored in the service provider database 132 based on the user profile generated at 408. For example, if the initial registration interface presented to the user at 404 requests the user to establish a username and the user's profile indicates that the user has already used that username in association with another user account, the security parameter circuit 130 may retrieve a security prompt requesting the user to establish a different username or a different password associated with the account.

In another example, the security parameter circuit 130 may run a comparison of the user attributes contained in the user profile generated at 408 to the various security prompts stored in the service provider database 132. For example, the security parameter circuit 130 may identify all of the user attributes contained in the user profile that were gained via accessing data sources 140-160 and only retrieve certain security prompts not bearing a direct relationship to the user attributes. To illustrate, if, the content gathering circuit 128 managed to learn the user's mother's maiden name, a user's pet's name, and various former user addresses by accessing data sources 140-160, the security parameter circuit 130 may only retrieve a set of security questions not asking such information from the user. In other words, security questions involving such attributes are excluded from the security questions retrieved to formulate the security prompt.

In another example, the security parameter circuit 130 may use the user attributes contained in the user's profile generated at 408 to set up logical tests for requested user security credentials. To illustrate, a logical test for a potential user password may be generated. Such a logical test may be configured to dynamically compare any user-input passwords against any user attributes contained in the user's profile. If a particular user has a dog named Spot, and the content gathering circuit 128 uncovered this fact by scanning data sources 140-160, for example, and the user attempts to input the word "Spot" (or close variants thereof) into a password field of the security prompt, the user-input password may fail the logical test. As such, the user would not be allowed to use that particular password and be requested to input a different password. Similar logical tests may be formulated for other user security credentials (e.g., PINS, usernames, security question answers, etc.).

In some arrangements, the risk assessment circuit 124 does not generate the user profile (e.g., by the process 300 discussed above) until after the user inputs information into the security prompts. In other words, in some arrangements, the risk assessment circuit 124 waits until additional information pertaining to the user has been received to formulate various information requests to be transmitted to data sources 140-160. In such arrangements and other arrangements, the user security prompts may be specifically configured to receive information from the user that is necessary to formulate information requests to various data sources 140-160. As discussed above, the content gathering circuit 128 may include a series of templates for formatting various information requests to receive information from data sources 140-160 (e.g., to access a specific URL likely to obtain information pertaining to a user, to request raw data pertaining to the user via an API, or to formulate a search for a specific user attribute at a data source). To populate these templates, certain information pertaining to the user may be required. Accordingly, the risk assessment circuit 124 may retrieve a series of security questions that instruct the user to input the required information as answers to those security questions.

At 412, the user is presented with the security prompt. In various example embodiments, the security parameter circuit 130 may transmit the prompts (or identities thereof) to the data exchange circuit 124, which may in turn transmit content (e.g., a webpage) to the user computing device 110 containing the prompts. The webpage may include various fields requesting the user to input information pertaining to the various prompts. For example, the web-page may include a username prompt, a password prompt, and several security question prompts. The username prompt may request the user to input a username. The password prompt may request the user to input a password. The webpage may include the logical tests discussed above in association with the password prompt such that, if the user types in a user attribute included in the user's profile, the password will be automatically rejected. The security question prompts may be selectively chosen to not prompt the user to input any attributes included in the user's profile.

At 414, user security responses are received. For example, the user may input a username, a password that meets the logical tests, and answers to the selectively-retrieved security questions. The user-input information may be transmitted to the data exchange circuit 124 over the network 170 and communicated to the security parameter circuit 130.

At 416, additional scans of data sources 140-160 are performed based on user security responses. For example, based on a username input by the user into the security prompt, the content gathering circuit 128 may search various data sources 140-160 (e.g., forms, blogs, and the like) for occurrences of the username. If the content gathering circuit 128 identifies any occurrences of the username, any of the various data extraction techniques discussed above may be used to identify any user attributes that may be learned. Any learned user attributes may be cross-referenced with the user's existing profile to determine if the attributes are associated with the user. For example, a blog post bearing the same username may include several user attributes (e.g., a user location, various user preferences, user friend names, pet names, and the like). If the content gathering circuit 128 identifies one of those attributes as being previously included in the user's profile, then the content gathering circuit may infer that the user has used the same username in the past. Additionally, any further attributes that can be learned through the instance of the username are also used to populate the user's profile.

The content gathering circuit 128 may also search data sources 140-160 that were not initially searched at step 408 using the additional information received from the user via the security prompt. For example, certain data sources may be attribute-specific rather than user-specific. In other words, a search by a user's name may not return any results, but a search of a user attribute (e.g., address) may return results (e.g., a real property title database or topic-specific forum). Accordingly, the content gathering circuit 128 may generate information requests to receive information from any such data sources 140-160 using the user-input information received at 414. Additionally, the content gathering circuit 128 may also re-formulate information requests sent to various data sources 140-160 that were scanned at 408 using more specifically formulated information requests to receive information directly pertaining to any information input by the user into the security prompt.

By performing such additional searches, the content gathering circuit 128 specifically searches for the user-input responses for the security prompts. For example, if a particular user inputs a username and answers a security question regarding the user's favorite grade school teacher into the security prompt presented at 412, the content gathering circuit may run a multi-tiered scan for the answer to that security question. This multi-tiered approach includes the content gathering circuit 128 performing at least two scans of a data source 140-160 for the user's answer. The first search may include formulating an information request to a data source including both the user's name (e.g., received at 406) as well as the name of the favorite teacher received at 414. For example, the content gathering circuit 128 may search a social media website for instances of the user posting about the favorite teacher. The second search may include formulating an information request to a data source including both the username and answer received at 414. Thus, by performing multiple searches regarding multiple associations of user answers, a more thorough search is performed. Such multi-tiered searches for a specific user answer to a security question may be performed for a plurality of data sources 140-160.

In cases where no scan of data sources 140-160 was performed at step 408, the content gathering circuit may perform a modified version of the method 300 discussed above. For example, instead of scanning data sources 140-160 generically for any obtainable user attributes, the content gathering circuit 128 may formulate information requests that are specifically tailored to the user-input responses to the security prompt received at 414. In other words, instead of generically searching the user's name and performing an analysis of the results to estimate various user attributes, the content gathering circuit 128 searches for pairings of the various user responses received at steps 406 and 414. This results in less data being received from data sources 140-160 and thus enables the content gathering circuit 128 to more quickly ascertain if user attributes specifically chosen by the user to be used as security credentials are learnable by accessing data bases 140-160.

At step 418, it is determined if any of the user security responses to the security prompt were recovered from data sources 140-160. Using any of the extraction and analysis techniques discussed above, the content gathering circuit 128 may determine if any user security responses involve accessible information. If the user security response is found in the information recovered from data sources 140-160, the security parameter circuit 130 reverts back to 410 and re-formulates the security prompt to ask for a different set of security credentials. For example, a different password may be requested or different security questions may be presented to the user.

At 420, if it is determined that none of the user's security credentials were recovered from data sources 140-160, the user's responses are set as security credentials for the user's account. In various arrangements, an entry in the service provider database 132 is created for the user and various user security responses (e.g., usernames, hashed passwords, security question answers, and the like) are stored in association with that entry.

Figure 5:
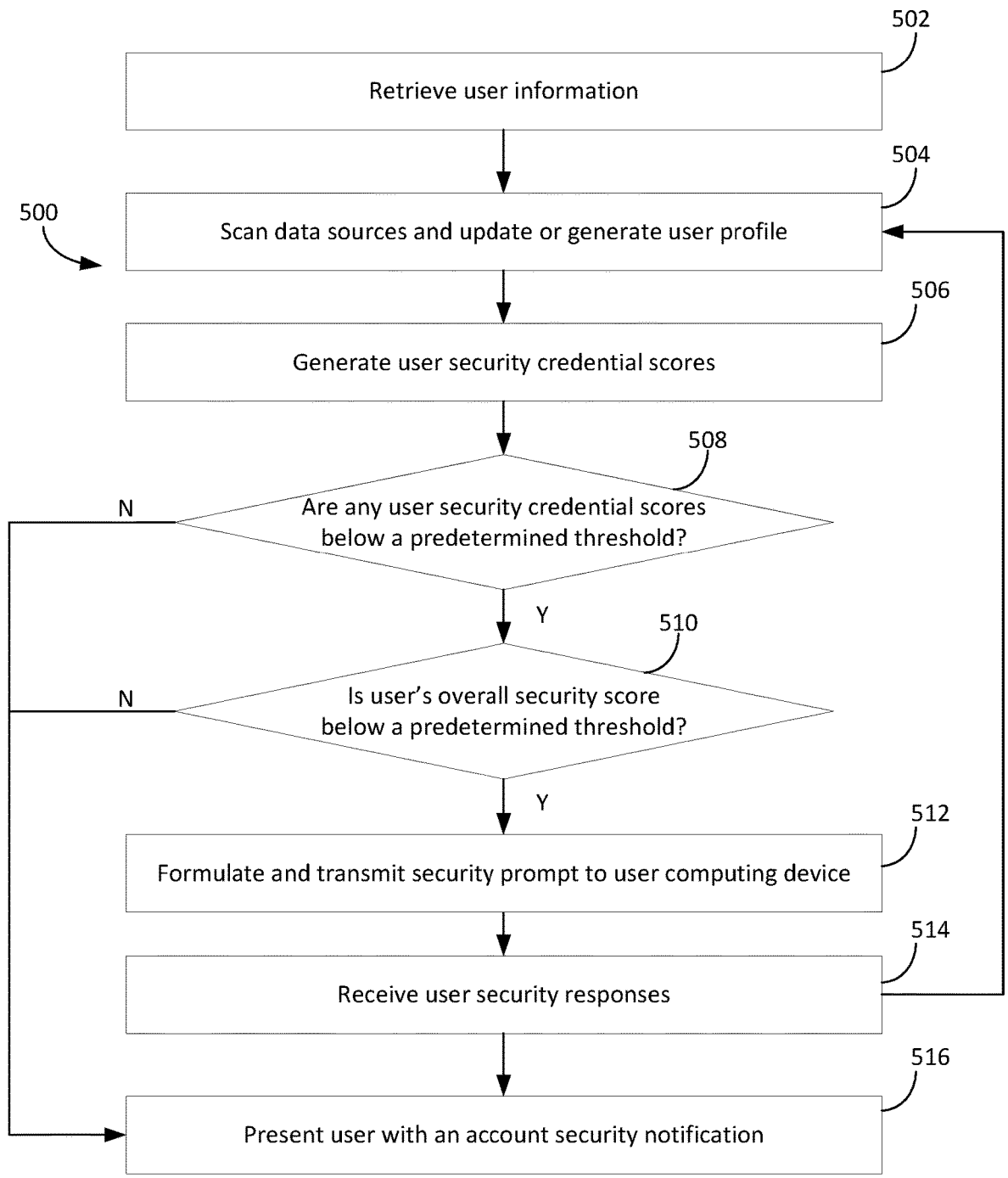
FIG. 5 is a flow diagram of a method of updating a set of user security credentials associated with a previously-existing user account, according to an example embodiment.

Referring now to FIG. 5, flow diagram of a method 500 of updating a set of user security credentials associated with a previously-existing user account is shown, according to an example embodiment. The method 500 may be performed by components of FIGS. 1-2 such that references may be made to one or more components of FIGS. 1-2 to aid the description of the method 500. In some arrangements, the risk assessment circuit 126 at the service provider computing system 120 periodically performs the method 500 after the user sets up an account by the method 400 discussed above. In some arrangements, the client application 112 on the user computing device 110 may periodically perform the method 500. For example, upon the user registering an account, the client application 112 may be transmitted to the user computing device 112 and include program logic structured to cause the user computing device 110 to perform any of the operations discussed below.

At 502 user information is retrieved. In various arrangements, the risk assessment circuit 126 retrieves information regarding the user from the service provider database 132. The retrieved user information may include, for example a user profile generated by any of the methods discussed above, user biographical information associated with the user's account (e.g., a user name, address, and the like), and security credentials associated with the user's account (e.g., a username, security questions, and the like).

At 504 data sources 140-160 are scanned for user information. For example, in some situations, if a profile such as those discussed above has never been created for the user, the risk assessment circuit 126 (e.g., via the content gathering circuit 128) performs the steps 301-312 of the method 300 discussed above in relation to FIG. 3 to generate a user profile.

If the user already has a previously-generated profile of user attributes, the risk assessment circuit 126 may scan the data sources 140-160 in a variety of different ways. In some embodiments, for example, the risk assessment circuit 126 may perform a search of the data sources 140-160 previously found (e.g., in the method 400 discussed above performed during the user's registration for an account) to include information concerning the user. For example, if during the generation of the user's account, the risk assessment circuit 126 found an attribute of the user at a particular social media webpage, the risk assessment circuit 126 may re-access that particular webpage and determine if any additional user attributes may be learned. A similar process may be repeated for each data source 140-160 previously found to include user information.

Alternatively or additionally, the risk assessment circuit 126 may also re-perform a general scan of data sources 140-160 in an attempt to learn an additional user attribute. For example, the risk assessment may re-perform the steps 304-310 discussed above and compare any learned user attributes with the existing user profile to determine if an additional user attribute has been discovered. Additionally, the risk assessment circuit 126 may also perform a more targeted search of data sources 140-160 specifically for existing security credentials stored in association with the user's account. In this regard, the risk assessment circuit 126 may perform a process similar to that performed at step 416 of the method 400 discussed above.

At 506, user security credential scores are generated. In some embodiments, each user security credential is given an accessibility score based on the relationship between the various user attributes contained in the user's profile to the content of the security credential. Generally, the more direct relationship that a particular user security credential has to a user attribute contained in the user's profile, the lower accessibility score that the security credential will receive. For instance, if a particular security question that requests the user to input the name of a pet is currently being used as a security credential and if the name of the user's current pet is obtainable via a social media website, that particular security question may receive the lowest possible security score. In another example, if the content gathering circuit 128 determines that a username has been used at multiple other service providers by the user, the username may receive a low accessibility score. Additionally, some security metrics may also be scored under a symbolic metric. While the user's existing password may be unknown to the security parameter circuit 130 (e.g., because the password was hashed when established by the user), other credentials may be given a symbolic strength score. For example, if answers to security questions are misspelled, they may be given a low symbolic strength. Additionally, a username may be given a low symbolic strength if it bears a close relationship to the user's legal name. Additionally, user security credentials may also be scored based on the amount of time that they have been utilized. For example, a password used for more than a predetermined period (e.g., six months) may receive a low timing score. Further, as discussed herein, once each security credential is scored based on each metric, an overall user security credential score may be produced as an average or weighted average of each of the individual scores for each component.

At 508, it is determined if any security credential scores are below a predetermined threshold. In some arrangements, if none of the security credentials score below the predetermined threshold, then the method 500 skips to step 516 to be described below. If at least one user security credential drops below the predetermined threshold, the user's overall security score is checked at 510. If the user's overall security is still above another predetermined threshold, then the method 500 may again skip to step 516.

However, if the user's overall security score does not pass the analysis at 510, a user security prompt is generated at 512. In various example embodiments, the security prompt requests the user to update or replace at least one user security credential based on the scores generated at 506. For example, if it was determined at step 508 that the user's username had an accessibility or overall credential score below a predetermined threshold, the security prompt may request the user to generate a new username. In another example, if it was determined at step 508 that an answer to a security question could be learned by accessing data sources 140-160, the security prompt may include an alternative security question that will replace the initial security question. After the security prompt is generated, it is transmitted to the user computing device 110.

At 514, user security responses are received. For example, the next time the user accesses the user's account, the client application 112 may be configured to present the user with an alert indicating to the user that the user's security credentials need to be re-set as well as the generated security prompt. The user may insert the requested security credential update and cause the information to be transmitted to the service provider computing system 120. Upon receipt of the updated credentials, the risk assessment circuit 126 may revert back to step 504 and re-search data sources 140-160 to determine if any of the user-input information is learnable by accessing data sources 140-160. For example, the risk assessment circuit 126 may perform a process similar to that performed at step 416 discussed above with respect to the method 400 and update the user's profile. Accessibility and other scores for the new user security parameters may also be generated and compared to the various thresholds discussed above to determine if there are any significant vulnerabilities in the user's updated security credentials. If not, then the updated user security credentials are stored in the service provider database 132 and established.

At 516, the user is presented with an account security notification. For example, upon the user accessing the user's account, the displays presented to the user by the client application 112 may include a security notification window that displays to the user the overall security score. The relationship between the user's overall security score and various thresholds may also be shown. For example, if the user's overall security score is relatively close to the threshold that the score was compared to at step 510, the user's score may show up as being orange while if the user's overall security score is relatively high, the user's score may show up as being green. The score may be presented to the user as a scaled number based on its distance from the threshold (e.g., from 1 to 10, with 1 being the lowest and 10 being the highest). Alternatively, the score may be presented to the user as a graph. Further, in some embodiments, the user may also be shown the individual scores of each individual security credential. This way, the user becomes aware of any security vulnerabilities or if any new information concerning the user has become available.

The embodiments described herein have been described with reference to drawings. The drawings illustrate certain details of specific embodiments that implement the systems, methods, and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input device," as described herein, may include any type of input device or input devices including, but not limited to, a keyboard, a keypad, a mouse, joystick, or other input devices capable of performing a similar function. Comparatively, the term "output device," as described herein, may include any type of output device or output devices including, but not limited to, a computer monitor, printer, facsimile machine, or other output devices capable of performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps, and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described to explain the principals of the disclosure and its practical application to enable one skilled in the art to utilize the various embodiments and with various modifications as are suited to the particular use contemplated. Other substitutions, modifications, changes, and omissions may be made in the design, operating conditions, and arrangement of the embodiments without departing from the scope of the present disclosure as expressed in the appended claims.

What is claimed is:

1. A computing system comprising:
   a network circuit enabling the computing system to exchange information over a network;
   a user database storing information pertaining to various user accounts for a plurality of users; and a risk assessment circuit configured to:
    search, by the network circuit over the network, at least one data source to identify a user attribute;
    determine the user attribute is related to a first security credential that is either associated with or potentially associated with a user account;
    generate a security prompt responsive to the determination, the security prompt either instructing the user to update information associated with the first security credential or instructing the user to input information regarding a second security credential different from the first security credential;
    transmit, by the network circuit over the network, the security prompt to a user computing device associated with the user;
    receive, by the network circuit, a request to register a user account, wherein the user database includes no information pertaining to an existing user account associated with the user prior to receiving the request;
    provide, by the network interface, a registration interface to the user computing device, the registration interface requesting registration information from the user and prompting the user to input a first username;
    receive, by the network interface, user registration information comprising a first username, wherein a first security credential includes a username;
    search based on the received user registration information including the first username; and
    determine that the user used the first username in association with another user account associated with a data source, wherein the security prompt instructs the user to update information associated with the first security credential by requesting the user to input an alternative username.

2. The system of claim 1, wherein the user database includes information pertaining to an existing user account associated with a second user, the information including user security credentials, wherein searching the at least one data source is performed based on the information stored in the user database, wherein determining that the user attribute is related to the first security credential includes comparing the user attribute to the user security credentials.

3. The system of claim 2, wherein the first security credential is a first security question, wherein the relationship between the user attribute and the first security credential is that the identified attribute is an answer to the first security question.

4. The system of claim 3, wherein the security prompt instructs the user to input information regarding the second security credential, wherein the second security credential includes a second security question different from the first security question.

5. The system of claim 1, wherein the security prompt instructs the user to input information regarding the second security credential.

6. The system of claim 5, wherein the risk assessment circuit is further configured to:
    receive, by the network circuit, user-input information regarding the second security credential;
    compare the user-input information to the searched content;
    determine that the user-input information is not stored at a data source; and
    store the user-input information as a security credential associated with a newly-created user account.

7. The system of claim 1, wherein the risk assessment circuit is further configured to:
    perform additional searching of the data source based on the received user-input information; and
    determine that the user-input information is not stored at the data source, wherein storing the user-input information as a security credential is responsive to determining that the user-input information is not stored at the data source.

8. A computer-implemented method, comprising:
    searching, by a computing system, a data source to identify a user attribute;
    determining, by the computing system, that the attribute is related to a first security credential that is either associated with or potentially associated with a user account;
    generating, by the computing system, a security prompt responsive to the determination, the security prompt either instructing the user to update information associated with the first security credential or instructing the user to input information regarding a second security credential that is different from the first security credential;
    transmitting, by the computing system, the security prompt to a user computing device associated with the user;
    receiving, by the computing system, a request to register for a new user account;
    transmitting, by the computing system, a registration interface to the user computing device, the registration interface requesting registration information from the user;
    receiving, by the network interface, user registration information, wherein searching is performed based on the received user registration information;
    receiving, by the computing system, user-input information regarding the second security credential;
    determining, by the computing system, that the user-input information is not stored at a data source; and
    storing, by the computing system, the user-input information as a security credential associated with a newly-created user account in an account database.

9. The method of claim 8, further comprising:
    retrieving, by the computing system, information pertaining to a previously-existing user account associated with the user from an account database, the information including user security credentials, wherein the searching is performed based on the retrieved information.

10. The method of claim 9, wherein the first security credential is a first security question, wherein the relationship between the user attribute and the first security credential is that the identified attribute is an answer to the first security question.

11. The method of claim 10, wherein the security prompt instructs the user to input information regarding the second security credential, wherein the second security credential includes a second security question that is different from the first security question.

12. The method of claim 8, further comprising:
    performing additional searching of at least one data source based on the received user-input information; and
    determining that the user-input information is not stored at a data source, wherein the storing of the user-input information as a security credential is responsive to determining that the user-input information is not stored at a data source.

13. A computer-implemented method, comprising:

searching, by a computing system, a data source to identify a user attribute;

determining, by the computing system, that the attribute is related to a first security credential that is either associated with or potentially associated with a user account;

generating, by the computing system, a security prompt responsive to the determination, the security prompt either instructing the user to update information associated with the first security credential or instructing the user to input information regarding a second security credential that is different from the first security credential;

transmitting, by the computing system, the security prompt to a user computing device associated with the user;

receiving, by the computing system, a request to register for a new user account;

transmitting, by the computing system, a registration interface to the user computing device, the registration interface requesting registration information from the user; and receiving, by the network interface, user registration information, wherein the searching is performed based on the received user registration information, wherein the registration interface prompts the user to input a first username, the received user registration information includes a first username, wherein the identified user attribute includes determining that the user used the first username in association with another user account associated with a data source and the first security credential includes a username, wherein the security prompt instructs the user to update information associated with the first security credential by requesting the user to input an alternative username.

14. A non-transitory computer readable media having computer-executable instructions embodied therein that, when executed by a risk assessment circuit of a computing system, causes the computing system to perform operations to identify a user security vulnerability, the operations comprising:

searching a data source to identify a user attribute;

determining that the user attribute is related to a first security credential that is either associated with or potentially associated with a user account;

generating a security prompt responsive to the determination, the security prompt either instructing the user to update information associated with the first security credential or instructing the user to input information regarding a second security credential that is different from the first security credential;

transmitting the security prompt to a user computing device associated with the user;

receiving a request to register for a new user account;

transmitting a registration interface to the user computing device, the registration interface requesting registration information from the user;

receiving user registration information, wherein searching is performed based on the received user registration information;

receiving user-input information regarding the second security credential;

determining that the user-input information is not stored at a data source; and storing, by the computing system, the user-input information as a security credential associated with a newly-created user account in an account database.

15. The media of claim 14, the operations further comprising retrieving information pertaining to a previously-existing user account associated with the user from an account database, the information including user security credentials, wherein the searching is performed based on the retrieved information.

\* \* \* \* \*